US009292250B2

(12) United States Patent
Krig et al.

(10) Patent No.: US 9,292,250 B2
(45) Date of Patent: Mar. 22, 2016

(54) DEVICES, METHODS, AND SYSTEMS FOR PROVIDING INTERACTIVITY WITH DIGITAL SIGNS

(71) Applicant: Intel Corporation, Santa Clara, CA (US)

(72) Inventors: Scott A. Krig, Santa Clara, CA (US); Cynthia A. Pickering, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 241 days.

(21) Appl. No.: 13/629,115

(22) Filed: Sep. 27, 2012

(65) Prior Publication Data

US 2014/0085179 A1   Mar. 27, 2014

(51) Int. Cl.
*G09G 5/00* (2006.01)
*G06F 3/147* (2006.01)
*G06Q 30/00* (2012.01)
*G06F 3/01* (2006.01)

(52) U.S. Cl.
CPC ............. *G06F 3/147* (2013.01); *G06F 3/017* (2013.01); *G06Q 30/00* (2013.01); *G09G 2320/0261* (2013.01); *G09G 2354/00* (2013.01); *G09G 2380/06* (2013.01)

(58) Field of Classification Search
USPC .................................................. 345/156–184
See application file for complete search history.

(56) References Cited

U.S. PATENT DOCUMENTS

| | | | | |
|---|---|---|---|---|
| 2005/0256781 A1* | 11/2005 | Sands | ............. | G06Q 10/087 705/26.8 |
| 2011/0199290 A1* | 8/2011 | Vendrow | ............. | G06F 3/023 345/156 |
| 2012/0029691 A1* | 2/2012 | Mockus | ............. | G06Q 20/18 700/232 |
| 2013/0195322 A1* | 8/2013 | Santhiveeran | ..... | G06Q 30/0269 382/118 |

FOREIGN PATENT DOCUMENTS

WO   2013089705 A1   6/2013

OTHER PUBLICATIONS

U.S. Appl. No. 13/631,484, filed Sep. 28, 2012, 42 pages.
"Digital signage," Wikipedia, The Free Encyclopedia, retrieved from: <http://en.wikipedia.org/w/index.php?title=Digital_signage&oldid=453679195>, revised Oct. 3, 2011, 7 pages.

* cited by examiner

*Primary Examiner* — Carolyn R Edwards
(74) *Attorney, Agent, or Firm* — Barnes & Thornburg LLP

(57) ABSTRACT

A device, method, and system for providing interactivity with a digital sign includes an interactive digital sign configured to display information in response to interactions by a viewer. The viewer may interact with the digital sign using sensors of the digital sign or via use of a mobile communication device carried by the viewer. User data may be used by the interactive digital sign to select the information, which may include advertisements, coupons, directions, and other information. The information may be transmitted to the viewer's mobile communication device.

18 Claims, 10 Drawing Sheets

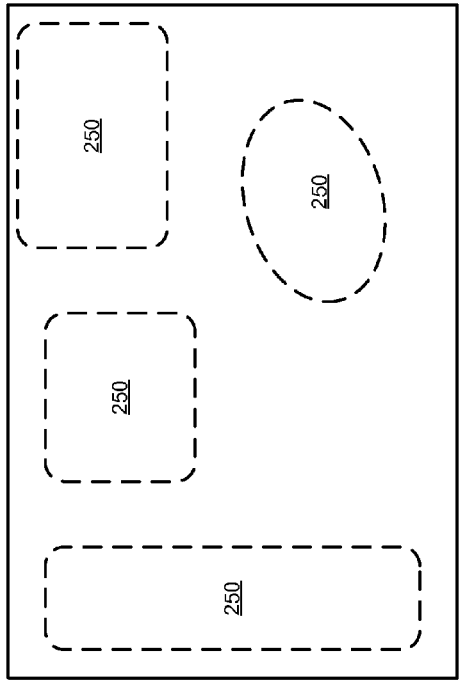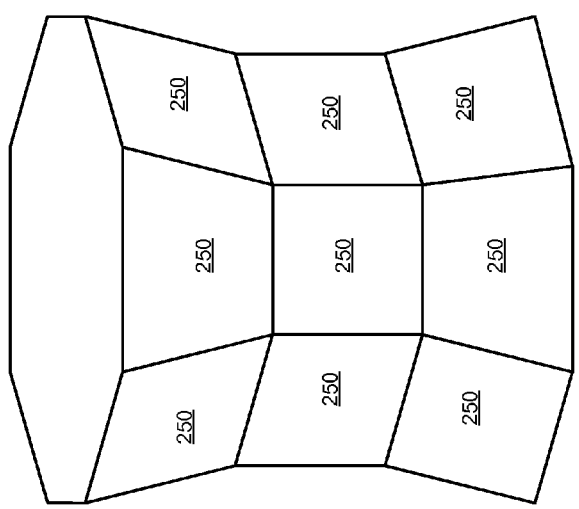

DEVICES, METHODS, AND SYSTEMS FOR PROVIDING INTERACTIVITY WITH DIGITAL SIGNS

BACKGROUND

Digital signs are used to display information, such as advertisements, notifications, directions, and the like, to people in the near vicinity of the sign. Unlike static billboard signs, the information displayed on a digital sign may be programmed to change over time. For example, a digital sign may be configured to display certain information one day and different information on a different day. Although the information displayed on typical digital signs may change over time, such changing of information is generally pre-defined or random such that a viewer of the digital sign has limited interaction with the information displayed.

Mobile communication devices are becoming ubiquitous tools for personal, business, and social uses. While the primary use for many mobile communication devices remains person-to-person communication via voice or textual technologies, modern mobile communication devices are equipped with increased processing power and data storage capability to allow such devices to perform advanced processing. For example, many modern communication devices, such as typical "smart phones," are capable of executing specialized operating systems and associated software applications. Additionally, many modern mobile communication devices are capable of connecting to various data networks, including the Internet, to retrieve and receive data communications over such networks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified block diagram of at least one embodiment of a display of the interactive digital sign of the system of FIG. 1;

FIG. 7 is a simplified block diagram of at least one embodiment of a display of the interactive digital sign of the system of FIG. 1;

FIG. 8 is a simplified block diagram of at least one embodiment of a display of the interactive digital sign of the system of FIG. 1;

DETAILED DESCRIPTION OF THE DRAWINGS

Figure 1:
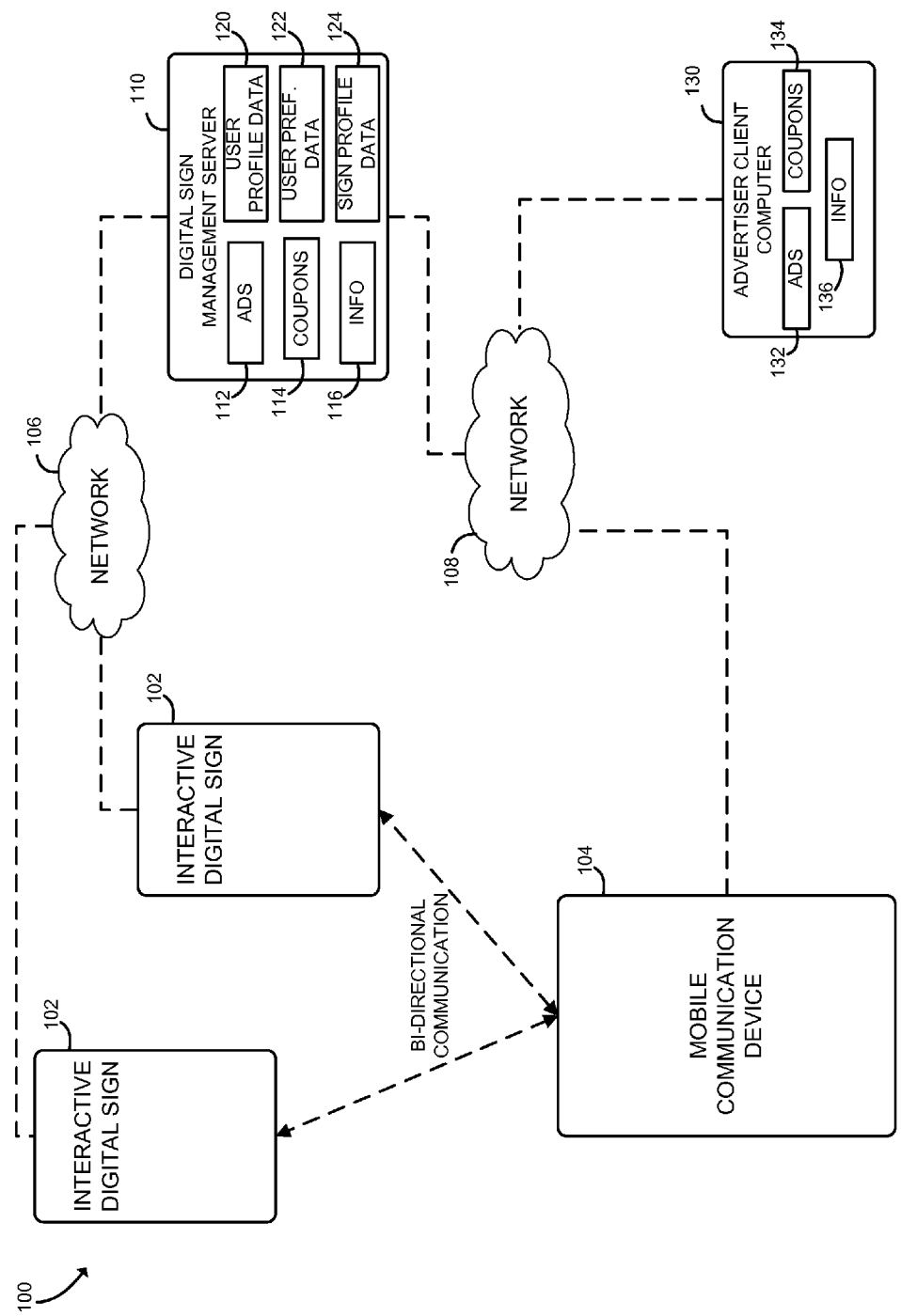
FIG. 1 is a simplified block diagram of at least one embodiment of a system for providing interactivity with one or more digital signs.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for providing digital sign interactivity includes one or more interactive digital signs 102 and one or more mobile communication devices 104, which are capable of bi-directional wireless communication with each other as discussed in more detail below. In use, as discussed in more detail below, the interactive digital signs 102 are configured to display information to viewers on one or more associated displays. The displayed information may be selected based on the context and interaction of the viewer and/or the mobile communication device 104 carried by the viewer. For example, in some embodiments, each interactive digital sign 102 is configured to select information for display based on a physical gesture performed by a viewer within the vicinity of the digital interactive sign 102 (e.g., a hand waving gesture, a smile gesture, etc.), based on a physical characteristic of the viewer (e.g., gender, estimated age, hair color, etc.), and/or on user data received from the mobile communication device 104 or other data sources. Such displayed information may include, for example, digital advertisements, digital coupons, directions and digital maps, multimedia, computer games, and/or other digital information. In some embodiments, the selected information may also be transmitted to the mobile communication device 104 for storage and use at locations away from the interactive digital sign (e.g., at the store offering the digital coupon).

Figure 2:
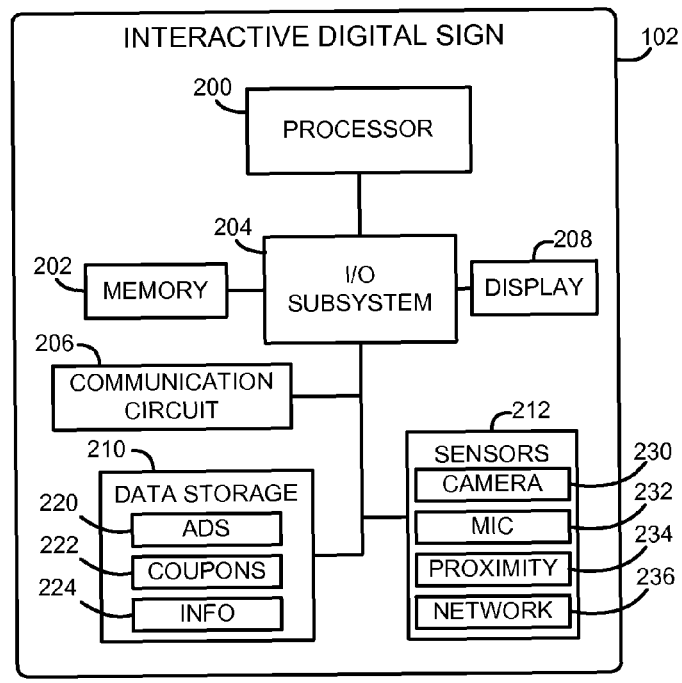
FIG. 2 is a simplified block diagram of at least one embodiment of an interactive digital sign of the system of FIG. 1.

The interactive digital signs 102 may be embodied as any type of digital sign for displaying digital information to a viewer and performing the functions described herein. Although only two interactive digital signs 102 are shown in FIG. 1, it should be appreciated that the system 100 may include a single interactive digital sign 102 or multiple interactive digital signs 102 in other embodiments. As shown in FIG. 2, the illustrative interactive digital signs 102 are embodied as "smart signs," and each includes a processor 200, a memory 202, an input/output subsystem 204, communication circuit 206, a display 208, and a data storage device 210. Of course, the interactive digital signs 102 may include other or additional components, such as those commonly found in a digital sign and/or computer (e.g., various input/output devices), in other embodiments. Additionally, in some embodiments, one or more of the illustrative components may be incorporated in, or otherwise from a portion of, another component. For example, the memory 202, or portions thereof, may be incorporated in the processor 200 in some embodiments.

The processor 200 may be embodied as any type of processor currently known or developed in the future and capable of performing the functions described herein. For example, the processor may be embodied as a single or multi-core processor(s), digital signal processor, microcontroller, or other processor or processing/controlling circuit. Similarly, the memory 202 may be embodied as any type of volatile or non-volatile memory or data storage currently known or developed in the future and capable of performing the functions described herein. In operation, the memory 202 may store various data and software used during operation of the interactive digital sign 102 such as operating systems, applications, programs, libraries, and drivers. The memory 202 is communicatively coupled to the processor 200 via the I/O subsystem 204, which may be embodied as circuitry and/or components to facilitate input/output operations with the processor 200, the memory 202, and other components of the interactive digital sign 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 200, the memory 202, and other components of the interactive digital sign 102, on a single integrated circuit chip.

The communication circuit 206 of the interactive digital sign 102 may be embodied as any communication circuit, device, or collection thereof, capable of enabling communications between the interactive digital sign 102 and the mobile communication device 104 and/or other remote devices. The communication circuit 206 may be configured to use any one or more communication technology (e.g., wireless or wired communications) and associated protocols (e.g., Ethernet, Bluetooth®, Wi-Fi®, WiMAX, etc.) to effect such communication.

The display 208 of the interactive digital sign 102 may be embodied as any type of display on which information may be displayed to a viewer of the interactive digital sign 102. The illustrative display 208 may include one or more individual display screens to display similar or dissimilar information. For example, as shown in FIGS. 6-8, the display 208 may be embodied as a collection of display screens 250. Each display screen 250 may be embodied as, or otherwise use any suitable display technology including, for example, a liquid crystal display (LCD), a light emitting diode (LED) display, a cathode ray tube (CRT) display, a plasma display, and/or other display technology currently known or developed in the future. In some embodiments, as shown in FIG. 6, the display screens 250 may be arranged in a geometric pattern to allow multiple viewers to interact with the interactive digital sign 102 via one or more of the individual display screens 250. Any type of geometric pattern or design may be used and, in some embodiments, the display screens 250 may be arranged in a pattern to resemble another structure, logo, design, character or person, building, vehicle, or other feature. In other embodiments, the plurality of display screens 250 of the display 208 may be arranged in a more organized pattern such as the large, multi-screen arrangement illustrated in FIG. 7. Alternatively, in some embodiments as illustrated in FIG. 8, the display screen 250 is embodied as an existing wall, screen, or other structure on which content is displayed via, for example, a projector or other display device. In such embodiments, the size, shape, arrangement, and/or location of the individual display screens 250 may change over time or in response to interaction from a user.

As discussed in more detail below, one or a multiple of display screens 250 may be used to display content to a viewer. For example, a video may be displayed across several display screens 250 to generate a larger display format. Additionally, each display screen 250, or collection of display screens 250, may be temporally allocated to a different viewer. In that way, a single interactive digital sign 102 may facilitate interaction with multiple viewers. Further, the display screen(s) 250 interacted with by a particular viewer may change in response to interactions of the viewer. For example, with regard to FIG. 6, the display screen 250 allocated to a viewer may change as the viewer walks around the display structure so as to follow the viewer.

Referring back to FIG. 2, the data storage 128 may be embodied as any type of device or devices configured for short-term or long-term storage of data such as, for example, memory devices and circuits, memory cards, hard disk drives, solid-state drives, or other data storage devices. In the illustrative embodiment, the interactive digital sign 102 may maintain one or more digital advertisements 220, digital coupons 222, and/or other information 224 in the data storage 210. As discussed in more detail below, the digital advertisements 220, digital coupons 222, and/or other information 224 may be displayed on the display 208 in response to the context of the viewer and/or user data received from the mobile communication device 104 or other remote devices. The digital advertisements 220, digital coupons 222, and other digital information 224 may be embodied as any type of digital data capable of display on the display 208 and, in some embodiments, transmitted to mobile communication device 104. For example, the digital advertisements 220, digital coupons 222, and other digital information 224 may be embodied as static digital images, video, text, and/or other multi-media data.

The interactive digital signs 102 may also include one or more sensors 212. The sensors 212 are configured to generate sensor data indicative of context data of a viewer of the interactive digital sign 102 such as, for example, the viewer's presence, gender, hair color, height, build, clothes, actions performed by the viewer, and/or other context data. For example, in the illustrative embodiment, the sensors 212 may include a camera 230, a microphone 232, a proximity sensor 234, and/or a network analyzer 236. The camera 230 may be embodied as any type of digital camera capable of producing still or motion pictures from which the interactive digital sign 102 may determine context data of a viewer (e.g., using edge detection, pattern recognition, or other image analysis process). Similarly, the microphone 232 may be embodied as any type of audio recording device capable of capturing local sounds and producing audio signals usable by the interactive digital sign 102 to determine context data of a viewer (e.g., using voice recognition or other audio processing technology). The proximity sensor 234 may be embodied as any type of suitable sensor capable of generating sensor data indicative of the presence and/or motion of a viewer within a pre-defined range of the interactive digital sign 102. Additionally, the network analyzer 236 may be embodied any type of circuit, module, or device capable of monitoring a network or network activity to determine the presence of a computer device (e.g., the mobile communication device 104) on such network and/or within the vicinity of the interactive digital sign 102. Of course, it should be appreciated that interactive digital sign 102 may include additional or other sensors in other embodiments.

The mobile communication device 104 may be embodied as any type of mobile communication device capable of performing the functions described herein including, but not limited to, a mobile phone, a smart phone, a tablet computing device, a personal digital assistant, a messaging device, a consumer electronic device, a handset, a laptop computer, and/or any other mobile computing/communication device. The illustrative mobile communication device 104 includes a processor 300, a memory 302, an input/output subsystem 304, a communication circuit 306, and a data storage 310. Those components of the mobile communication device 104 may be similar to the corresponding components of the interactive digital sign 102, the description of which is applicable to the corresponding components of the mobile communication device 104 and is not repeated herein for clarity of the description. In the illustrative embodiment, the mobile communication device 104 may maintain user profile data 320, user preference data 322, and/or user shopping data 324 in the data storage 310, which may be transmitted to the interactive digital sign 102 during interaction therewith. The user profile data 320 may be embodied as data that defines personal characteristics of the user of the mobile communication device 104 such as, for example, the user's gender, age, ethnicity, residence address, height, hair color, eye color, clothing or shoe size, and/or other profile data. The user preference data may be embodied as any type of data that identifies preferences of the user of the mobile communication device 104. Such preferences may be related to the system 100, such as the user's preferences for interacting with the interactive digital signs 102, preferences for receiving digital coupons, language preferences, and so forth, and/or commercial preferences of the user such as brand or product preferences, historical purchasing data, and/or other commercial preference data. The shopping list data may embodied as any type of data that identifies products or services that the user of mobile communication device 104 desires to purchase (i.e., a "shopping list"). Of course, in other embodiments, the mobile communication device 104 may maintain additional or other types of data in the data storage 310.

The mobile communication device 104 may also include one or more peripheral devices 314. For example, in the illustrative embodiment, the mobile communication device 104 includes several peripheral input/output devices 314 including a display 330, a keypad or keyboard 332, and a microphone 334. The display 330 may be embodied as any type of display configured for a mobile communication device and capable of displaying data to the user. Similarly, the keypad 332 may be embodied as any type of hard or soft keypad or keyboard for use with a mobile communication device. Illustratively, the keypad 332 is incorporated into the mobile communication device 104. Similarly, the microphone 334 may also be incorporated into the mobile communication device 104 and be embodied as any type of audio sensor capable of capturing audio data (e.g., speech data) in the vicinity of the mobile communication device 104.

Referring back to FIG. 1, in some embodiments, the system 100 may also include a digital sign management server 110, which manages the various data used by the interactive digital sign 102. The digital sign management server 110 may be embodied as any type of data server capable of performing the functions described herein and includes components (e.g., processors, memory devices, etc.) commonly found in such data servers. The interactive digital signs 102 may communicate, periodically or responsively, with the digital sign management server 110 over a network 106 to retrieve various data. The network 106 may be embodied as any type of suitable data network including, for example, a wired network, a wireless network, a local area or wide area network, a point-to-point network, an ad hoc network, and/or other data network across which information may be shared between the interactive digital signs 102 and the digital sign management server 110.

The digital sign management server 110 may maintain a database of digital advertisements 112, digital coupons 114, and/or other digital information (e.g., directions, maps, menus, etc.) from which the corresponding information stored on the interactive digital sign 102 may be updated. As such, in use, each interactive digital sign 102 may store only a small selection of the available digital advertisements and digital coupons as discussed above. If the interactive digital sign 102 determines that additional or other digital advertisements or digital coupons are required (e.g., based on a viewer's context or user data received from the mobile communication device 104), the interactive digital sign 102 may communicate with the digital sign management server 110 to receive additional digital advertisements 112, digital coupons 114, and/or other digital information.

In some embodiments, the mobile communication device 104 may also communicate, periodically or occasionally, with the digital sign management servers 110 over a network 108 to update, or otherwise maintain, user data on the digital sign management server 110. Similar to the network 106, the network 108 may be embodied any type of wired and/or wireless data network. In the illustrative embodiment, the network 108 is embodied as a global, publicly-available network such as the Internet.

The digital sign management server 110 may maintain a database of user data, which may include user profile data 120 and user preference data 122. The user profile data 120 is similar to the user profile data 320, and the user preference data 122 is similar to the user preference data 322, stored on the mobile communication device 104. The digital sign management server 110 may also maintain sign profile data 124 that identifies characteristics of individual interactive digital signs 102 such as sign type, sign location, supported features, supported interactions, and/or other characteristics of the interactive digital signs 102. The mobile communication device 104 may query the digital sign management server 110 to access such sign profile data 124 to determined, for example, the location of the nearest interactive digital sign 102 and its capabilities.

The system 100 may also include one or more advertiser client computers 130, which may be embodied as any type of computer or computing device capable of performing the functions described herein. The advertiser client computer 130 is usable by an advertiser to communicate with the digital sign management server 110 over the network 108 to store and/or update the server 110 with digital advertisements 132, digital coupons 134, and/or other digital information 136, which may be stored on the advertiser client computer 130. In this way, new digital advertisements, coupons, and information may be displayed on the interactive digital signs 102 and presented to the user.

Figure 4:
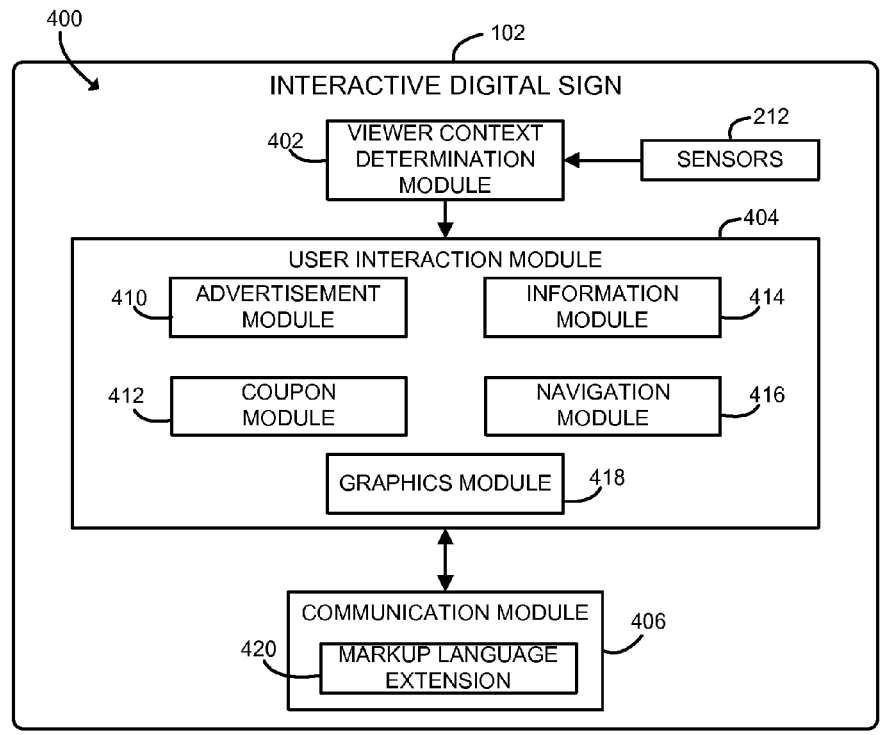
FIG. 4 is a simplified block diagram of at least one embodiment of an environment of the interactive digital sign of the system of FIG. 2.

Referring now to FIG. 4, in one embodiment, the interactive digital sign 102 may establish an environment 400 during operation. The illustrative environment 400 includes a viewer context determination module 402, a user interaction module 404, and a communication module 406, each of which may be embodied as software, firmware, hardware, or a combination thereof. As discussed in more detail below, the viewer context determination module 402 is configured determine the context of a viewer of the interactive digital sign 102 based on the sensor signals received from the sensors 212. For example, the viewer context determination module 402 may detect the presence of a viewer within a pre-defined range of the interactive digital sign 102, determine a personal characteristic of the viewer (e.g., gender, age, hair color, etc.), determine whether the viewer has performed a pre-defined physical gesture (e.g., a hand waving gesture), and/or determine other context parameters about the viewer as a function of the sensor data. As discussed above, the sensor data generated by the sensors 212 may be embodied as any type of data from which the context parameters of the viewer may be determined including, but not limited to, image data, video data, audio data, proximity sensor data, communications data (e.g., data from the communication module 406), and/or other sensor data.

The viewer context determination module 402 provides the generated context parameters to the user interaction module 404, which may select information for display and facilitate interaction with the viewer (and/or the mobile communication device 104 carried by the viewer) based on the context parameters. The illustrative user interaction module 404 includes an advertisement module 410, a coupon module 412, an information module 414, a navigation module 416, and a graphics module 418, each of which may be embodied as firmware, software, hardware, or a combination thereof. The advertisement module 410 manages the selection and display of digital advertisements 220 based on the context parameters of the viewer (e.g., the viewer's presence, a physical gestures performed by the viewer, etc.) and/or the user data received from the mobile communication device 104 (e.g., the user's profile or preference data). Similarly, the coupon module 412 manages the selection and display of digital coupons 222 based on the context parameters of the viewer and/or the user data. The information module 414 manages the selection and display of other digital information 224 based on requests for such information received from the user (e.g., voiced or gesture-based requests received from by sensors 212, requests received from the mobile communication device 104, etc.). The navigation module 416 manages the determination and presentation of directions and other navigational data in response to requests for directions received from the viewer. To do so, the navigation module 416 may maintain a suitable digital map, which may be presented to the user in association with directions determined by the navigation module 416. The graphics module 418 manages the presentation of, and viewer's interaction with, multimedia data on the display 208. In some embodiments, for example, the graphics module 418 may present a digital avatar on the display 208 with whom the viewer may interact to receive information. Additionally, as discussed in more detail below, the graphics module 418 may receive multimedia data from the mobile communication device 104 (e.g., video, graphics, presentations, computer games, digital avatars, etc.) and display or execute the multimedia to allow the viewer to interact with the transmitted multimedia on the display 208.

The communication module 406 facilitates the bi-directional communication between the interactive digital sign 102 and the mobile communication device 104, as well as other remote devices such as the digital sign management server 110. In the illustrative embodiment, the communication module 406 includes a markup language extension 420, which is usable by the user interaction module 404 to identify parameters of transmitted and received information. For example, should the mobile communication device 104 request information pertaining to the capabilities of the interactive digital sign 102, the response sent by the interactive digital sign 102 may include the capabilities identified by special header tags of the markup language extension 420 as discussed in more detail below.

Figure 5:
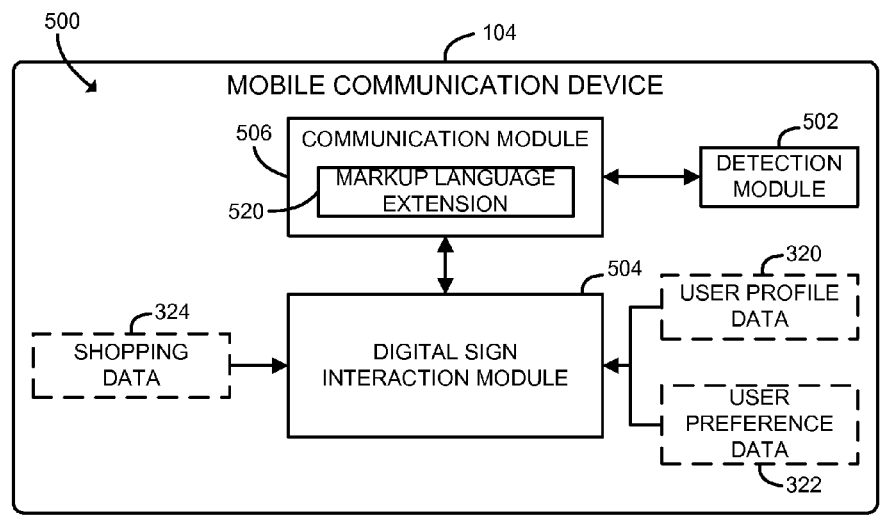
FIG. 5 is a simplified block diagram of at least one embodiment of an environment of the mobile communication device of the system of FIG. 3.

Referring now to FIG. 5, in one embodiment, the mobile communication device 104 may establish an environment 500 during operation. The illustrative environment 500 includes a detection module 502, a digital sign interaction module 504, and a communication module 506, each of which may be embodied as software, firmware, hardware, or a combination thereof. The detection module 502 is configured to detect the presence of an interactive digital sign 102 within the vicinity of the mobile communication device 104. In some embodiments, the detection module 502 may monitor local wireless networks and/or communications received by the communication module 506 to determine the presence of an interactive digital sign 102. In this way, the detection module 502 may perform automatic or near-automatic detection of an interactive digital sign 102.

The digital sign interaction module 504 facilitates interaction between the mobile communication device 104 and the interactive digital signs 102. For example, in some embodiments, the mobile communication device 104 may transmit user data, such as the user profile data 320, the user preference data 322, and/or the shopping data 324 to the interactive digital sign 102. Additionally, the digital sign interaction module 504 may allow the user to interact with the interactive digital sign 102 by submitting questions, requests, responses, and/or instructions to the interactive digital sign 102 as discussed in detail below. The digital sign interaction module 504 may further receive responses, and other data, from the interactive digital sign 102 and display such data on the display 330.

Similar to the communication module 406 of the interactive digital signs 102, the communication module 506 facilitates the bi-directional communication between the mobile communication device 104 and the interactive digital signs 102, as well as other remote devices such as the digital sign management server 110. In the illustrative embodiment, the communication module 506 includes a markup language extension 520, which is usable by the digital sign interaction module 504 to identify parameters of transmitted requests and/or other information as discussed in more detail below.

Figure 9:
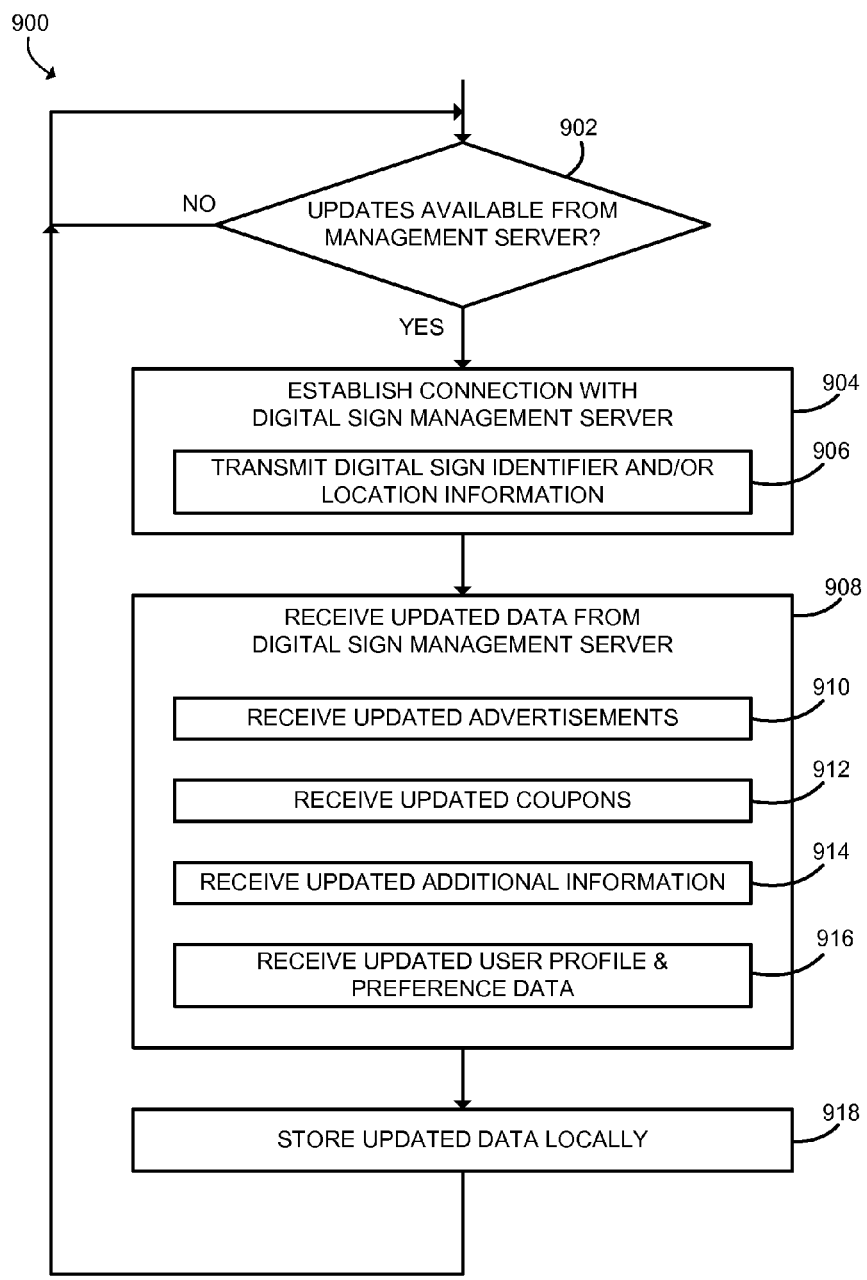
FIG. 9 is a simplified flow diagram of at least one embodiment of a method for updating an interactive digital sign that may be executed by the interactive digital sign of FIG. 2.

Referring now to FIG. 9, in use, the interactive digital signs 102 may execute a method 900 for updating information locally stored on the interactive digital sign 102 from the digital sign management server 110. The method 900 begins with block 902 in which the interactive digital sign 102 determines whether updates are available from the digital sign management server 110. To do so, the interactive digital sign 102 may query, periodically or occasionally, the digital sign management server 110 for updates. Additionally or alternatively, the digital sign management server 110 may notify the interactive digital sign 102 when updates are available.

If no updates are available, the method 900 loops back to block 902 in which the interactive digital sign 102 continues to monitor for updates. However, if interactive digital sign 102 determines that updates are available, the interactive digital sign 102 establishes a communication connection with the digital sign management server 110 over the network 106 in block 904. In some embodiments, such communication connection may be a secured connection. In block 906, the interactive digital sign 102 may transmit a digital sign identifier and/or location information that identifies the location of the digital sign 102 and/or other information usable by the digital sign management server 110 to identify the update-requesting interactive digital sign 102.

Subsequently, in block 908, the interactive digital sign 102 receives updated data from the digital sign management server 110, which is subsequently stored in the local data storage 210 of the interactive digital sign 102 in block 918. For example, the interactive digital sign 102 may receive new or updated digital advertisements in block 910, new or updated digital coupons in block 912, and/or new or updated additional digital information in block 914 from the digital sign management server 110. Additionally, in some embodiments, the interactive digital sign 102 may locally store and maintain user profile and preference data. In such embodiments, the interactive digital sign 102 may receive new or updated user profile and/or preference data in block 916. After any received updated data is locally stored in block 918, the method 900 loops back to block 902 in which the interactive digital sign 102 continues to monitor for updates.

Figure 10:
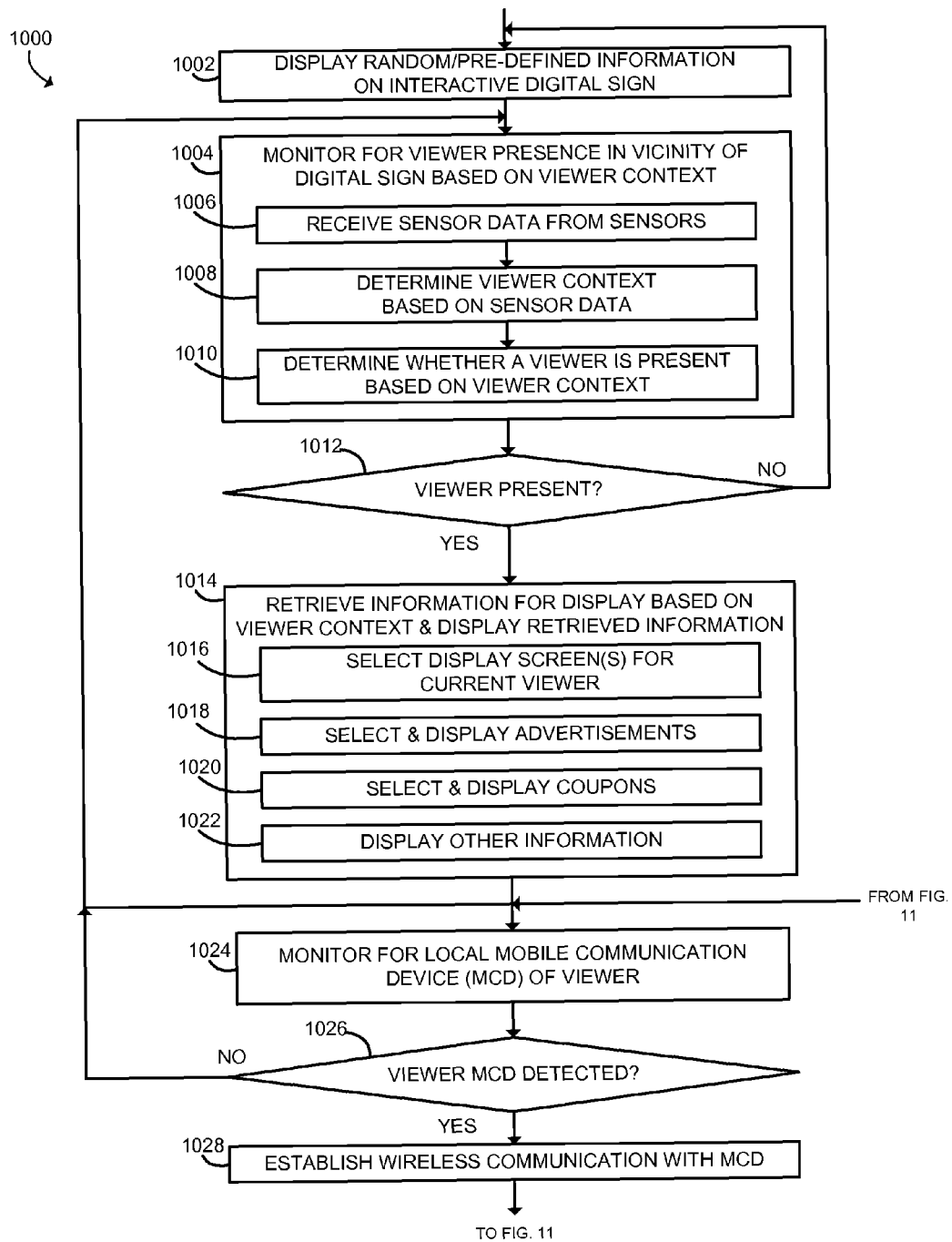
FIGS. 10 and 11 is a simplified flow diagram of at least one embodiment of a method for facilitating interactivity with a digital sign that may be executed by the interactive digital sign of FIG. 2.
Figure 11:
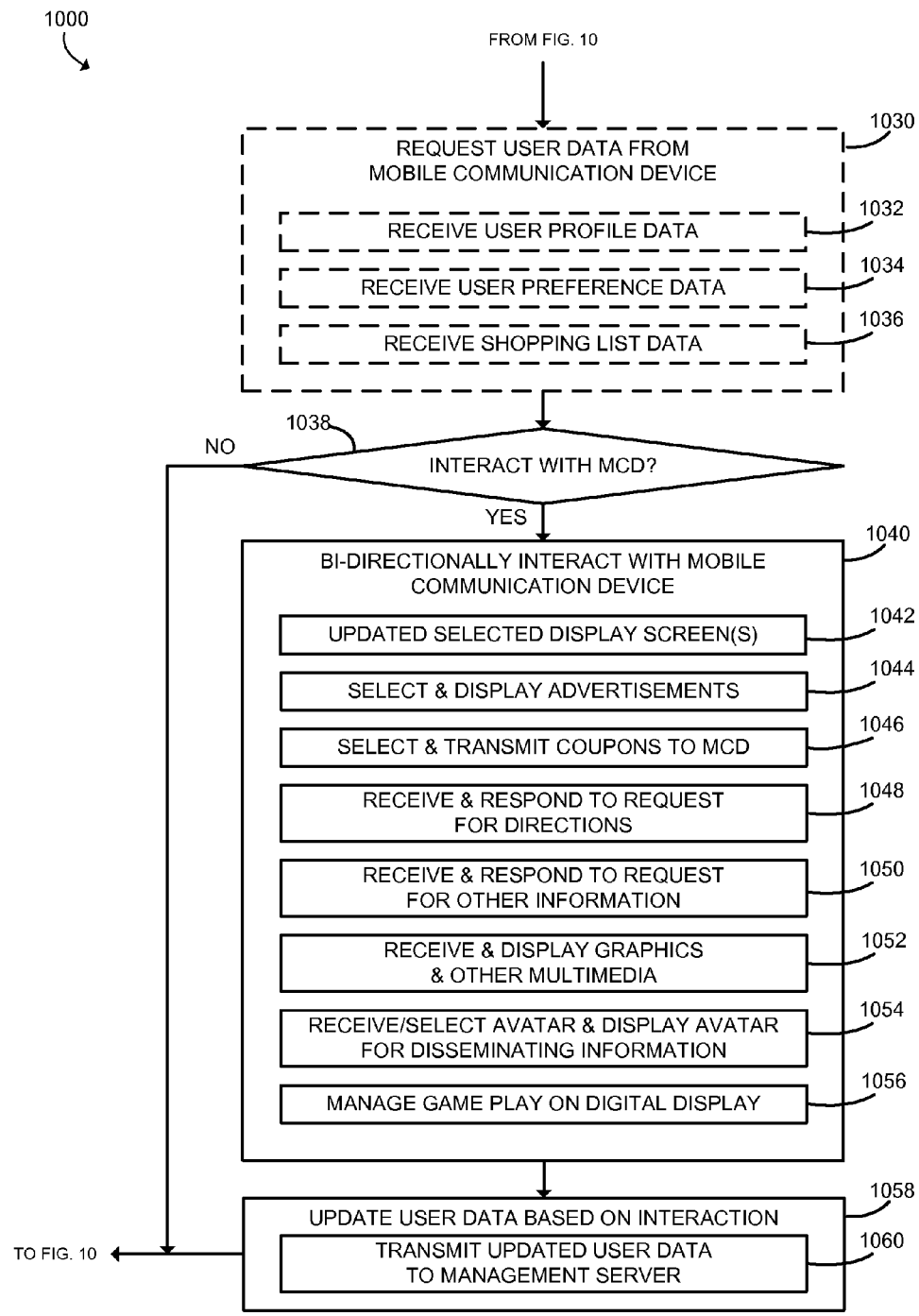

Referring now to FIGS. 10 and 11, in use, the interactive digital signs 102 may also execute a method 1000 for facilitating interactivity with the digital sign 102. The method 1000 begins with block 1002 in which the interactive digital sign 102 displays random and/or pre-defined digital information on the display 208. The random/pre-defined digital information displayed in block 1002 may be embodied as any type of digital information, such as digital advertisements and/or information, which may also change periodically. In block 1004, the interactive digital sign 102 monitors for the presence of a viewer within the vicinity of the digital sign 102. To do so, in block 1006, the interactive digital sign 102 receives sensor data from the sensors 212 and determines viewer context data from such sensor data in block 1008. The context data of any present viewer may include any type of data that identifies a context parameter of the viewer. For example, the interactive digital sign 102 may analyze the images generated by the camera 230, using a suitable facial recognition, pattern recognition, edge detection, or other image analysis process, to determine physical characteristics of the viewer (e.g., the presence of the viewer, gender, age, height, weight, hair color, and/or other physical characteristic) and/or non-physical characteristics of the viewer (e.g., the viewer's mood, emotional state, reactions, body language interpretation, level of interest, and/or other emotional or non-physical characteristic). Additionally, the interactive digital sign 102 may analyze the audio data generated by the microphone 232 to determine physical characteristics (e.g., the viewers age, gender, nationality, location, etc.) and non-physical characteristics (e.g., the viewer's mood, emotional state, level of interest, etc.).

In block 1010, the interactive digital sign 102 determines whether a viewer is present based on, at least a portion of, the determined context data. For example, the interactive digital sign 102 may determine the presence of the viewer within a pre-defined range based on sensor data received from the camera 230 (e.g., whether a viewer is present in the digital image generated by the camera), from the microphone 232 (i.e., whether a viewer is speaking), from the proximity sensor 234 (e.g., whether a viewer is moving), and/or from the network analyzer 236 (e.g., whether a viewer is operating the mobile communication device 104). In this way, a viewer may approach the interactive digital sign 102 (or one of the display screens 250) and automatically be detected and interacted with by the interactive digital sign 102.

If no viewer is determined to be present in block 1012, the method 1000 loops back to block 1002 in which the interactive digital sign 102 again displays random or pre-defined digital information. However, if a viewer is determined to be present in block 1012, the method 1000 advances to block 1014 in which the interactive digital sign 102 retrieves digital information for display on the display 208 as a function of the determined context parameters of the viewer. To do so, in block 1016, the interactive digital sign 102 determines which display screen 250, or selection of display screens 250, to allocate for use with the newly detected viewer. The interactive digital sign 102 may select the display screen(s) 250 based on, for example, the context data of the viewer. For example, the interactive digital sign 102 may select the display screen 250 determined to be closest to the viewer, at eye-level with the viewer, or based on other context data of the viewer. As discussed above with regard to FIGS. 6-9, the digital interactive sign 102 may select multiple display screens 250 for use with displaying content information to the detected viewer. Such selection of display screen(s) 250 may change based on the interaction of the viewer. For example, if the viewer works around the interactive digital sign 102, the display screen 250 used to display content to the viewer may change so as to follow the viewer about the digital interactive sign 102. Additionally, in some embodiments, the viewer may select the one or more display screens 250 with which to interact.

After the display screen(s) has been determined or selected, the interactive digital sign 102 may retrieve and display one or more digital advertisements 220 in block 1018, retrieve and display one or more digital coupons 222 in block 1020, and/or retrieve and display additional digital information 224 in block 1022. The interactive digital sign 102 may retrieve the selected information from the local data storage 210 and/or from the digital sign management server 110 based on any suitable context parameter. For example, in some embodiments, the interactive digital sign 102 may select the information to be retrieved based on a physical gesture performed by the viewer (e.g., a hand waving gesture), a physical characteristic of the viewer (e.g., gender, age, hair color, etc.), or other context parameter associated with the viewer and determinable based on the sensor data generated by the sensors 212.

After the selected digital information has been displayed on the display 208 in block 1014, the method 1000 loops back to block 1004 to continue monitoring for the presence of the viewer. Additionally, the method 1000 may advance to block 1024 in which the interactive digital sign 102 contemporaneously monitors for the presence of a local mobile communication device 104 (e.g., the device 104 of the viewer). To do so, the interactive digital sign 102 may periodically broadcast a query, notification, or other communication ping and determine the presence of a local mobile communication device 104 based on a response to such broadcast communication. Additionally or alternatively, the interactive digital sign 102 may monitor a wireless communication network on which the interactive digital sign 102 is located for the presence of a local mobile communication device 104. If no local mobile communication device 104 is detected in block 1026, the method 1000 loops back to block 1004 to continue monitoring for the presence of the viewer. However, if a local mobile communication device 104 is detected, the method 1000 advances to block 1028 in which the interactive digital sign 102 establishes a bi-directional wireless communication link with the discovered mobile communication device 104. Such bi-directional wireless communication link may be embodied as an ad-hoc communication link, a point-to-point communication link, a communication network link, and/or other wireless communication link that facilitates bi-directional communication between the interactive digital sign 102 and the discovered mobile communication device 104.

After the wireless communication link is established in block 1028, the method 1000 advances to block 1030 (see FIG. 11) in which the interactive digital sign 102 may request user data from the mobile communication device 104. The user data may be embodied as any type of data stored on the mobile communication device 104 and usable by the interactive digital sign 102 to select personalized digital information (e.g., digital advertisements, coupons, etc.) for display. In the illustrative embodiment, the interactive digital sign 102 may receive user profile data in block 1032, user preference data in block 1034, and/or shopping list data in block 1036. As discussed above, the user profile data may be embodied as data that defines personal characteristics of the viewer, the user preference data may be as any type of data that identifies preferences of the viewer, and the shopping list data may embodied as any type of data that identifies products or services that the viewer desires to purchase. Of course, additional or other user data may be received by the interactive digital sign 102 in block 1030 in other embodiments.

In block 1038, the interactive digital sign 102 determines whether to interact with the mobile communication device 104. In some embodiments, the interactive digital sign 102 may be configured to interact with all mobile communication devices 104 or with only selected mobile communication device 104. Additionally or alternatively, the interactive digital sign 102 may interact only upon receiving an initial request or communication from the mobile communication device 104. If the interactive digital sign 102 determines that no interaction is to occur, the method 100 loops back to block 1024 (see FIG. 10) in which the interactive digital sign 102 continues to monitor for local mobile communication devices.

If, however, the interactive digital sign 102 determines to allow interaction with the mobile communication device 104, the method 1000 advances to block 1040 in which the interactive digital sign 102 interacts with the mobile communication device 104 over the bi-directional communication link. For example, in block 1042, the interactive digital sign 102 updates the selected display screen(s) 250 based on the viewer's interaction, user data, and/or context data. That is, the interactive digital sign 102 may change which display screen(s) 250 are allocated for displaying content to the particular viewer and/or change the number of display screens 250 used to display content to the particular viewer. Such selection may be in response to any interaction or data related to the particular viewer. For example, the interactive digital sign 102 may change the selection and/or number of display screens 250 based on the location or movement of the viewer, based on a selection made by the viewer, based the size or type of content selected for display to the user (e.g., a selected advertisement may require multiple display screens 250 to properly display), based on the size or type of content received from the viewer for display, and/or on other interactions, user data, or context data of the user.

In block 1044, the interactive digital sign 102 may select and display one or more digital advertisement 220 on the display 208 based on the user data received in block 1030 and/or the viewer context determined in block 1008. For example, the interactive digital sign 102 may select an advertisement based on the user's profile (e.g., the viewer may be determined to be a young male) and the user's preferences (e.g., the viewer may like rock music). Additionally, in block 1046, the interactive digital sign 102 may select one or more digital coupons based on the user data (e.g., the user's shopping data) and/or viewer context and transmit the selected digital coupon to the mobile communication device 104. In some embodiments, the interactive digital sign 102 may encrypt the digital coupon for security or privacy purposes and transmit the encrypted digital coupon to the mobile communication device 104, which may subsequently decrypt the encrypted digital coupon. In such embodiments, the encrypted digital coupon may be usable only by the designated person (e.g., only usable on the specific mobile communication device 104) and/or be non-transferable to a third party. As discussed in more detail below, the viewer may utilize the digital coupon received on the mobile communication device 104 to aid in purchases made at a store remote from the interactive digital sign 102.

The interactive digital sign 102 may further receive and respond to a request for directions in block 1048. For example, in some embodiments, the interactive digital sign 102 may display a digital map, along with directions, on the display 208 in response to a user's request for directions to a particular destination and/or in response to other data received form the user (e.g., the shopping data). In some embodiments, the interactive digital sign may also transmit the digital map and/or directions to the mobile communication device 104 in block 1048 such that the viewer may review the directions while traveling to the destination. The interactive digital sign 102 may also receive and respond to requests for other digital information in block 1050. Such other digital information may be embodied as any type of digital information displayable on the display 208 and/or transmittable to the mobile communication device 104. For example, the additional digital information may include information related to the capabilities of the interactive digital sign 102, information related to the location of the interactive digital sign 102, information related to events occurring at locations near the interactive digital sign 102, information related to stores associated with a digital coupon, and/or other information.

In some embodiments, the interactive digital sign 102 may be configured to receive multimedia data from the mobile communication device 104 and display the multimedia data on the digital sign 102 in block 1052. Such multimedia data may be embodied as any type of multimedia data including, but not limited to, digital video, digital pictures, presentations, and/or other graphics. In this way, a viewer of the interactive digital sign 102 may utilize the display 208 as a remote display device for the mobile communication device 104. Additionally, in some embodiments, the interactive digital sign 102 may select a digital avatar or character for display on the display 208 and disseminate information to the viewer using the digital avatar in block 1054. For example, the digital avatar may interact with the viewer using spoken audio and be responsive to physical gestures performed by the viewer and/or user data transmitted to the interactive digital sign 102 by the viewer. In some embodiments, the digital avatar may be transmitted to the interactive digital sign 102 from the mobile communication device 104. Further, in some embodiments, the interactive digital sign 102 may be configured to execute a computer game to allow the viewer to play the computer game using the display 208 in block 1056. The executed computer game may be stored on the interactive digital sign 102 or be transmitted thereto from the mobile communication device 104 in block 1056. In this way and unlike a static digital display, the interactive digital sign 102 facilitates interaction with the viewer and the mobile communication device 104.

In some embodiments, the interactive digital sign 102 may update the user data in block 1058 after the viewer has completed interaction with the interactive digital sign 102. For example, the user preference data may be updated based on such interactions (e.g., which digital coupons did the viewer accept, which digital advertisements were of interest to the viewer, etc.). Additionally, in some embodiments, the updated user data may be transmitted to the digital sign management server 110 for storage in block 1060. After the user data has been updated in block 1058, the method 1000 loops back to block 1024 to continue monitoring for the presence of local mobile communication devices 104 and to block 1004 to continue to monitor for the presence of new viewers.

Figure 12:
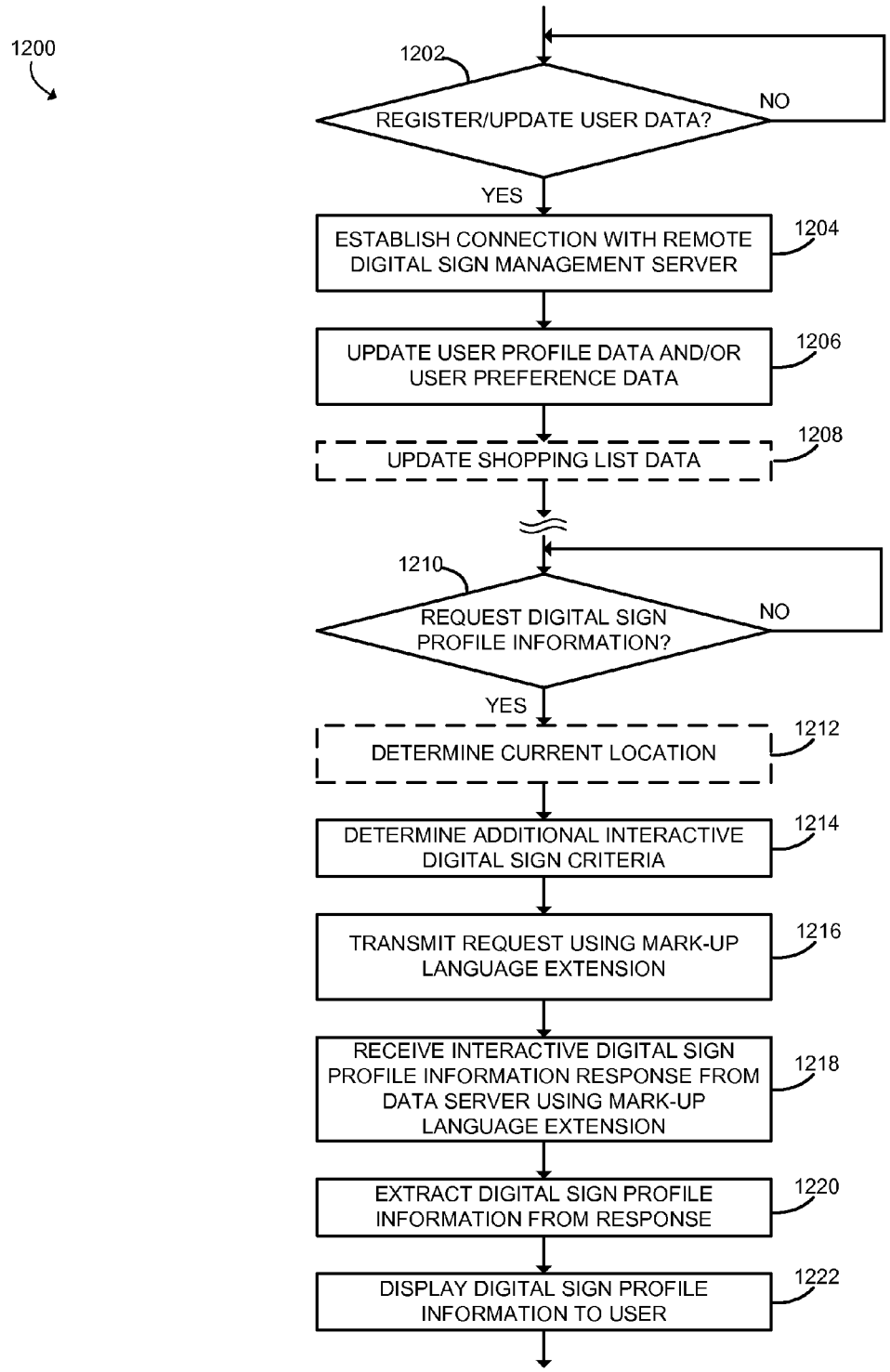
FIG. 12 is a simplified flow diagram of at least one embodiment of a method for registering and communicating with a digital sign management server, which may be executed on the mobile communication device of FIG. 3.

Referring now to FIG. 12, in use, the mobile communication device 104 may execute a method 1200 for registering and communicating with the digital sign management server 110. Although the method 1200 is described below as registering the user of the mobile communication device 104 with the digital sign management server 110, such registration method may be used with individual interactive digital sign 102 in those embodiments in which the interactive digital signs 102 maintain local user data without assistance of a digital sign management server 110.

Figure 3:
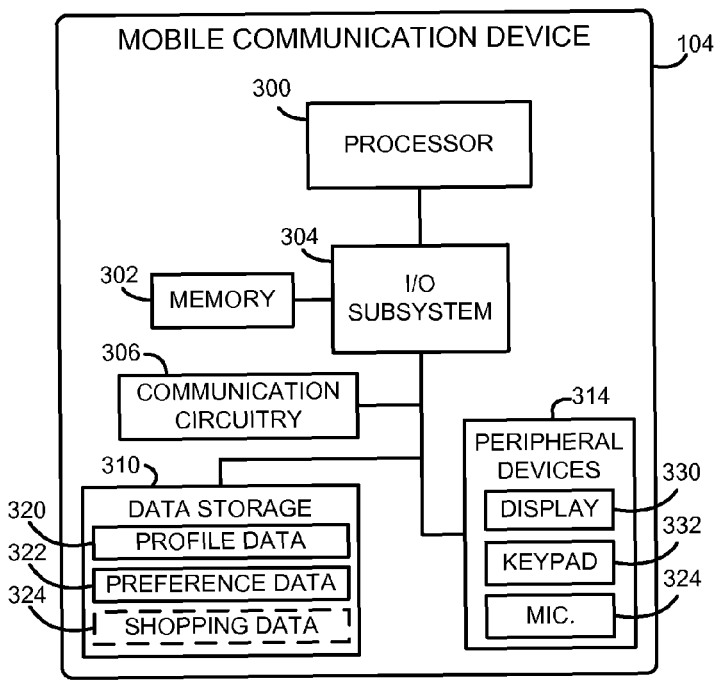
FIG. 3 is a simplified block diagram of at least one embodiment of a mobile communication device of the system of FIG. 1.

The method 1200 begins with block 1202 in which the mobile communication device 104 determines whether to register or update user data. If so, the method 1200 advances to block 1204 in which the mobile communication device 104 establishes a communication connection with the digital sign management server 110 (or directly with an interactive digital sign 102). Such communication connection may be embodied as a secure communication connection in some embodiments. In block 1206, the mobile communication device 104 transmits the user profile data 320 and/or user preference data 322 (see FIG. 3) to the digital sign management server 110 (or directly with an interactive digital sign 102), which stores the updated or new user data in the data storage 210. In some embodiments, the mobile communication device 104 may also transmit shopping data 324 to the digital sign management server 110 (or directly with an interactive digital sign 102) in block 1208.

After the user of the mobile communication device 104 has registered with the digital sign management server 110, the method 1200 advances to block 1210 in which the mobile communication device 104 determines whether the user has requested digital sign profile information. The digital sign profile information may identify characteristics of the interactive digital signs 102 such as the location of the nearest interactive digital sign 102, the capabilities of the interactive digital signs 102, the digital coupons available from the interactive digital signs, and other sign characteristic data. Additionally, the digital sign profile information may include data related to the user's digital sign account such as the number of award points obtained, the number of digital coupons used, and other account information.

In some embodiments, the mobile communication device 104 may determine a current location of the device 104 (e.g., using a global positioning system circuit or other location determination circuit or module) in block 1212. Alternatively, the user may supply the current location or other location of interest, which may be used to determine nearby interactive digital signs 102. In block 1214, the mobile communication device 104 may obtain and/or request additional interactive digital sign criteria. Such criteria may include any data usable to identify digital sign profile information including, for example, the identity information of the user (e.g., an e-mail address), digital sign preferences of the user (e.g., full-featured signs, interactive sighs, etc.), digital sign capability preferences (e.g., digital coupons), and/or other digital sign criteria.

In block 1216, the mobile communication device 104 transmits a request for digital sign profile information using the determined current location and/or additional interactive digital sign criteria. In the illustrative embodiment, the request is transmitted using the markup language extension 520 (see FIG. 5), which identifies the individual request parameters. For example, the request may include a header tag that identifies the user's location or desired location (e.g., "MyLocation: GPS: xx.xx.xx.xx Address: xxx.xxx.xxx"), a header tag that identifies the user's digital sign preferences (e.g., "My Preferences: xxx"), a header tag that identifies the user's account or other identification data (e.g., "MyShoppingID: xxxx"), and/or other header tags that identify individual parameters of the request.

In block 1218, the mobile communication device 104 receives the requested interactive digital sign profile information from the digital sign management server 110 (or directly from the interactive digital sign 102 as discussed above). In some embodiments, the response is transmitted using a markup language extension (e.g., markup language extension 420 of FIG. 4) to identify individual parameters of the requested information. For example, the response may include a header tag that confirms the location of the user or the desired location (e.g., "GPS-Check: xxx", "Address-Check: xxx"), a header tag that identifies the location of nearby interactive digital signs 102 (e.g., "Closest Signs: xxx"), a header tag that identifies award points and/or information related to digital coupons such as which stores accept the digital coupons (e.g., "Coupons-and-points: xxx"), a header tag that identifies an answer or other data related to a previous question or request (e.g., "Information: xxx"), and/or other header tags that identify individual parameters of the response.

In block 1220, the mobile communication device 104 extracts the digital sign profile information from the response using the head tags of the mark-up language extension. The extracted information may be subsequently displayed to the user of the mobile communication device 104 in block 1222 and/or stored for later use. In this way, the user may query the digital sign management server 110 and/or individual interactive digital signs 102 for obtain digital sign profile data to help the user locate digital signs 102 of interest and/or monitor their interaction and accounts.

Figure 13:
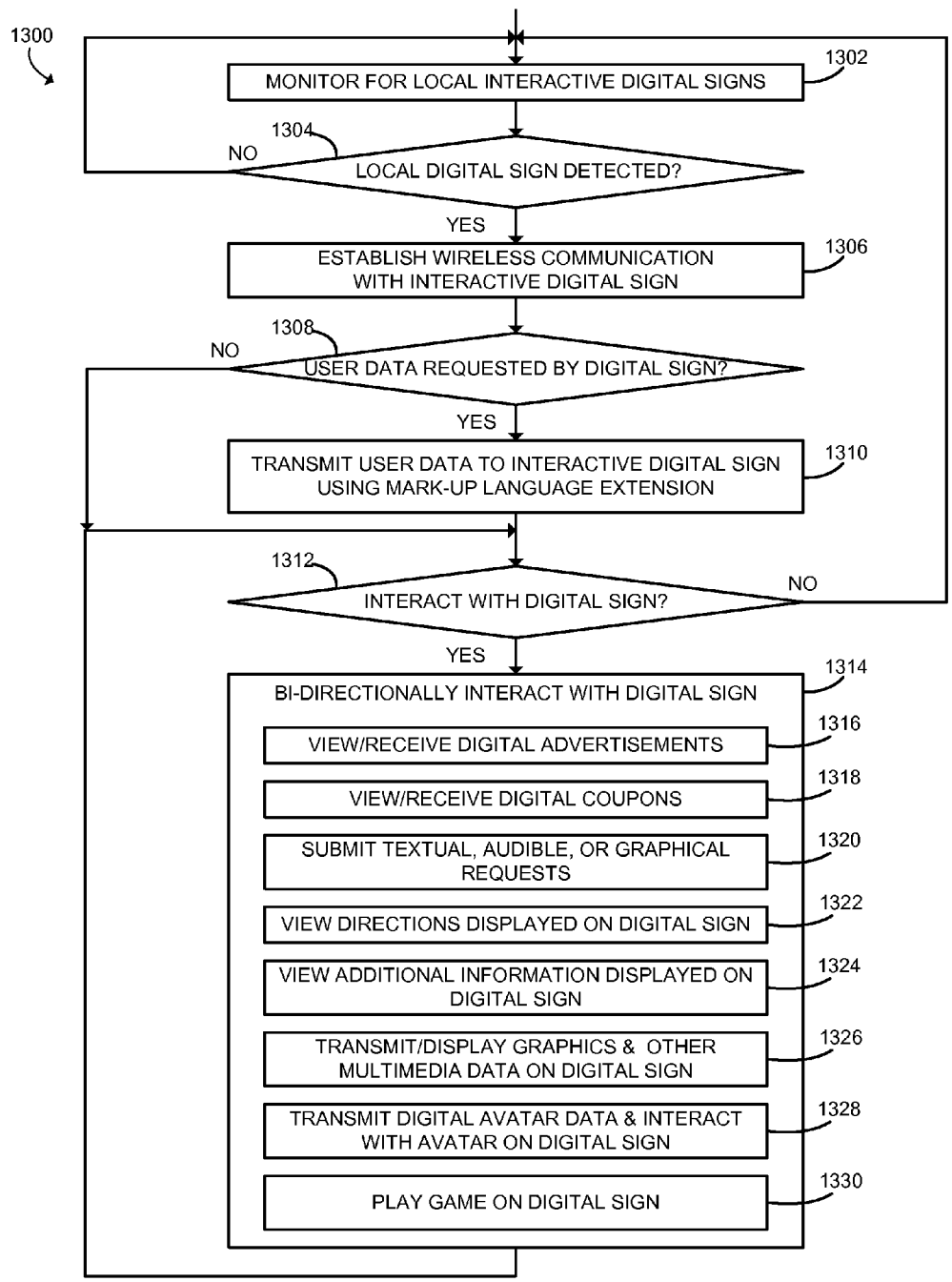
FIG. 13 is a simplified flow diagram of at least one embodiment of a method for interacting with a digital sign that may be executed on the mobile communication device of FIG. 3.

Referring now to FIG. 13, the mobile communication device 104 may also execute a method 1300 for interacting with one or more interactive digital signs 102. The method 1300 begins with block 1302 in which the mobile communication device 104 monitors for local interactive digital signs 102. To do so, the mobile communication device 104 may monitor for a query, notification, or other communication ping or heartbeat signal received directly from an interactive digital sign 102. Additionally or alternatively, the mobile communication device 104 may search for a wireless communication network associated with the interactive digital sign 102 and determine the presence of the interactive digital sign 102 based on the existence of such wireless network. In this way, the mobile communication device 104 may actively monitor for nearby interactive digital signs 102 with minimal or no direct interaction from the user of the mobile communication device 104. As such, the user of the mobile communication device 104 may simply approach the interactive digital sign 102 to initiate interaction therewith.

If no local interactive digital sign 102 is detected in block 1304, the method 1300 loops back to block 1302 to continue monitoring for nearby interactive digital signs 102. However, if an interactive digital sign 102 is detected by the mobile communication device 104 in block 1304, the method 1300 advances to block 1306. In block 1306, the mobile communication device 104 establishes a bi-directional wireless communication link with the detected interactive digital sign 102. As discussed above with regard to block 1028 of method 1000, the bi-directional wireless communication link may be embodied as an ad-hoc communication link, a point-to-point communication link, a communication network link, and/or other wireless communication link that facilitates bi-directional communication between the mobile communication device 104 and the interactive digital sign 102.

After a wireless communication link has been established with the interactive digital sign 102 in block 1306, the mobile communication device 104 determines whether a request for the user data stored locally on the mobile communication device 104 has been received from the detected interactive digital sign 102 in block 1308. If so, the method 1300 advances to block 1310 in which the mobile communication device 104 retrieves the requested user data from the data storage 310 (see FIG. 3) and transmits the user data to the requesting interactive digital sign 102. As discussed above, the user data may include user profile data 320, user preference data 322, and/or shopping data 324. In some embodiments, the mobile communication device 104 may transmit the user data using the markup language extension 520 (see FIG. 5). For example, the response to the request for user data may include a header tag that identifies the user profile data 320, a header tag that identifies the user preference data 322, and/or a header tag that identifies the shopping data 324. Of course, additional or other mark-up language data tags may be used in other embodiments to identify the individual parameters of the user data.

After the mobile communication device 104 has transmitted the requested user data, or if no user data was requested in block 1308, the method 1300 advances to block 1312. In block 1312, the mobile communication device 104 determines whether interaction with the interactive digital sign 102 is desired. In some embodiments, the mobile communication device 104 may be configured to interact automatically with the interactive digital sign 102 or to interact with the interactive digital sign 102 only upon instructions from the user.

If no interaction with the interactive digital sign 102 is desired or required, the method 1300 loops back to block 1302 to continue to monitor for nearby interactive digital signs 102. However, if interactive with the interactive digital sign 102 is desired, the method 1300 advances to block 1314 wherein the mobile communication device 104 (and the user thereof) bi-directionally interacts with the interactive digital sign 102. As discussed above, the interactions between the user of mobile communication device 104 and the interactive digital sign 102 may be embodied as one or more different types of interactions, which may occur sequentially or contemporaneously with each other. For example, in block 1316, the user may view digital advertisements presented on the display 208 of the interactive digital sign 102 in response to the transmitted user data. The mobile communication device 104 may also receive one or more digital advertisements from the interactive digital sign 102 in block 1316, which may be stored and/or displayed on the mobile communication device 104. Similarly, in block 1318, the user may view digital coupons presented on the display 208 of the interactive digital sign 102 and/or receive one or more digital coupons from the interactive digital sign 102, which may be stored and/or displayed on the mobile communication device 104. As discussed above, in some embodiments, the digital coupons may be encrypted by the interactive digital sign 102. If so, the mobile communication device 104 may decrypt the encrypted digital coupon in block 1318. Alternatively, the mobile communication device 104 may store the digital coupon in its encrypted state until the digital coupon is used wherein the encrypted digital coupon is decrypted at the time of use.

In some embodiments, the user may operate the mobile communication device 104 to submit textual, audible, and/or graphical requests to the interactive digital sign 102 in block 1320. For example, the user may text a request for information to the interactive digital sign 102. Additionally, the user may speak into the microphone 234 of the interactive digital sign 102 to submit the request or speak into the microphone 334 of the mobile communication device 104, which relays the request to the interactive digital sign 102 via the bi-directional communication link. If the user submits a request for directions, for example, the user may view the directions, and any associated digital map, displayed on the display 208 of the interactive digital sign 102 in block 1322. Additionally, in some embodiments, the interactive digital sign 102 may transmit the directions and/or digital map to the mobile communication device 104, which is received in block 1322. The user may then utilize the received directions and/or map to navigate to a desired location. Additionally, if the user submits a request for other information (e.g., information regarding local stores), the user may view the additional digital information displayed by the interactive digital sign 102 in block 1324. Again, in some embodiments, the interactive digital sign 102 may also transmit the requested digital information to the mobile communication device 104 in block 1324.

In some embodiments, the user may utilize the display 208 of the interactive digital sign 102 as a remote display. For example, in block 1326, the mobile communication device 104 may transmit digital graphics and/or other multimedia data to the interactive digital sign 102 for display or execution thereby. Such multimedia data may be embodied as, for example, digital video, digital pictures, static graphics, charts, presentations, textual data, audio recordings, music, sounds, and/or other multimedia data that may be displayed and/or executed by the interactive digital sign 102. For example, in some embodiments, the mobile communication device 104 may transmit a digital avatar to the interactive digital sign 102 in block 1328, which is subsequently displayed by the interactive digital sign 102. The user may interact with the digital avatar to request information and/or perform other interactions with the interactive digital sign 102. In this way, the user may utilize a personalized avatar or character. Additionally, in some embodiments, the user may interact with the interactive digital sign 102 by playing a computer game. In such embodiments, for example, the mobile communication device 104 may transmit the computer game to the interactive digital sign 102 (or request a computer game stored on the interactive digital sign 102) in block 1330. In response, the interactive digital sign 102 may execute the computer game and facilitate the user's game play using the display 208 and, in some embodiments, the user's mobile communication device 104 as a controller or the like. After the user has interacted with the interactive digital sign 102, the method 1300 loops back to block 1312 in which the mobile communication device 104 determines whether to continue interaction with the digital sign 102. In this way, the user may operate the mobile communication device 104 to interact with the interactive digital sign 102 to receive and disseminate information as discussed above.

Figure 14:
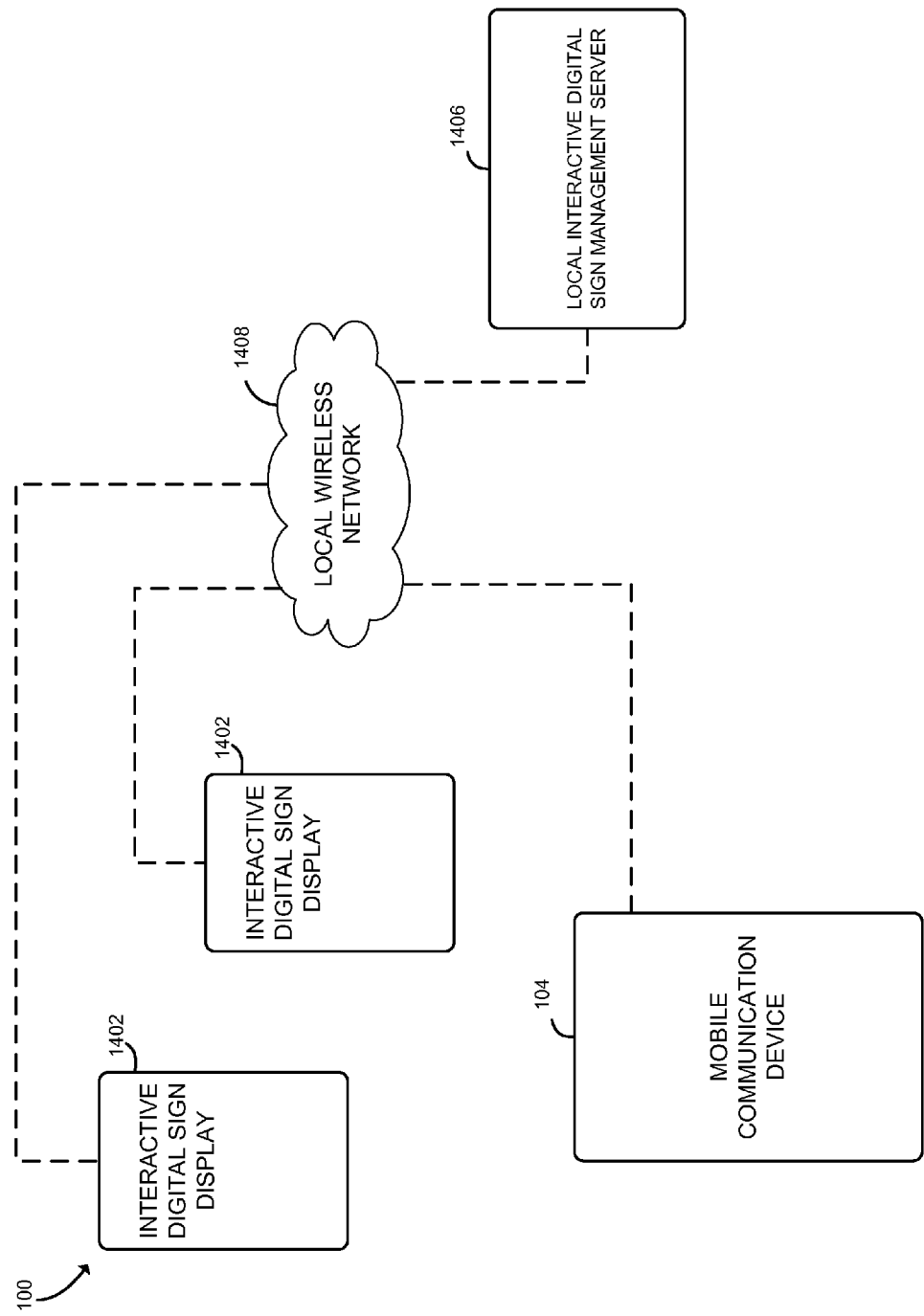
FIG. 14 is a simplified block diagram of at least one other embodiment of a system for providing interactivity with one or more digital signs.

Referring now to FIG. 14, although the interactive digital signs 102 have been described above as "smart signs" capable of determining information for display based on the viewer's context and user data received from the viewer's mobile communication device 104, the interactive digital signs 102 may be embodied as simple interactive digital sign displays 1402 in other embodiments. In such embodiments, the determination of which information to be displayed and the processing of interactions from the viewer and/or the mobile communication device 104 are offloaded to a local interactive digital sign management server 1406, which communicates with the interactive digital sign displays 1402 over a local wireless network 1408. For example, the local interactive digital sign management server 1406 may include the user interaction module 404, rather than each interactive digital sign display 1402, and select which information (e.g., digital advertisement, digital coupon, or other digital information) should be displayed by each interactive digital sign display 1402. Additionally, the mobile communication device 104 may communicate with the local interactive digital sign management server 1406 to interact with the digital sign displays 1402, rather than the displays 1402 directly. In such embodiments, a single local interactive digital sign management server 1406 may control one, two, or more interactive digital sign displays.

EXAMPLES

Illustrative examples of the devices, systems, and methods disclosed herein are provided below. An embodiment of the devices, systems, and methods may include any one or more, and any combination of, the examples described below.

Example 1 includes an interactive digital sign for providing information to a viewer. The interactive digital sign includes a display, a sensor to generate sensor data indicative of context parameters of the viewer; a viewer context determination module to detect the presence of the viewer within a predefined range of the display as a function of the sensor data, and a user interaction module to select information to be displayed on the display as a function of (i) the presence of the viewer and (ii) at least one additional context parameter of the viewer and to display the selected information of the display.

Example 2 includes the subject matter of Example 1, wherein the sensor is embodied as one of a camera, a microphone, a proximity sensor, or a communication circuit.

Example 3 includes the subject matter of any one of Examples 1 or 2, wherein the sensor comprises a camera and the user interaction module is to (i) identify at least one physical gesture performed by the viewer based on the sensor data and (ii) select information to be displayed on the display as a function of the presence of the viewer and the at least one of: a physical gesture performed by the viewer, a facial emotion displayed by the viewer, body language displayed by the viewer, demographic information related to the viewer, clothing worn by the viewer, and the gender of the viewer.

Example 4 includes the subject matter of any one of Examples 1-3, and wherein the at least one additional context parameter comprises at least one of: a physical characteristic of the viewer, voice data supplied by the viewer, and text data supplied by the viewer.

Example 5 includes the subject matter of any one of Examples 1-4, and wherein the information selected by the user interaction module comprises at least one of: an advertisement, a digital coupon, and a digital map.

Example 6 includes the subject matter of any one of Examples 1-5, and further includes a wireless communication module, and wherein the viewer context determination module is to detect the presence of a mobile communication device carried by the viewer and the wireless communication module is to establish a communication link with the mobile communication device in response to detecting the presence of the mobile communication device.

Example 7 includes the subject matter of any one of Examples 1-6, and wherein the user interaction module is to receive, using the communication module, user data transmitted by the mobile computing device, the user data comprising at least one of: user profile data defining personal characteristics of a user of the mobile computing device, user preference data indicative of preferences of a user of the mobile computing device, and shopping list data identifying a shopping list of purchasable items.

Example 8 includes the subject matter of any one of Examples 1-7, and wherein the user interaction module is to (i) select at least one of a digital advertisement and a digital coupon to be displayed on the display as a function of the user data and (ii) display the selected advertisement and/or digital coupon on the display.

Example 9 includes the subject matter of any one of Examples 1-8, and wherein the user interaction module is to transmit the selected digital advertisement and/or digital coupon to the mobile communication device.

Example 10 includes the subject matter of any one of Examples 1-9, and wherein the user interaction module is to receive a request for information from the mobile communication device and transmit, in response to the request and using the communication module, information to the mobile communication device using a mark-up language extension to identify parameters of the information.

Example 11 includes the subject matter of any one of Examples 1-10, and wherein the transmitted information includes at least one of a mark-up language tag that identifies a location of the interactive digital sign, a mark-up language tag that identifies information related to a digital coupon, and a mark-up language tag that identifies an answer to the request.

Example 12 includes the subject matter of any one of Examples 1-11, and wherein the user interaction module is to receive, using the communication module, a request for directions from the mobile computing device and display, in response to the request, directions on the display.

Example 13 includes the subject matter of any one of Examples 1-12, and wherein the user interaction module is to receive, using the communication module, multimedia data from the mobile communication device and to display the multimedia data on the display of the interactive digital sign.

Example 14 includes the subject matter of any one of Examples 1-13, and wherein the multimedia data comprises at least one of: a digital picture, a digital movie, a graphical representation, text data, and audio data.

Example 15 includes the subject matter of any one of Examples 1-14, and wherein the multimedia comprises a digital avatar and the user interaction module is to respond to interactions from the viewer using the digital avatar.

Example 16 includes the subject matter of any one of Examples 1-15, and wherein the user interaction module is to receive, using the communication module, a request for a computer game and to execute a computer game using the display to facilitate game play with the viewer.

Example 17 includes the subject matter of any one of Examples 1-16, and wherein the display comprises a plurality of display screens, and the user interaction module is to allocate a first subset of display screens and display the selected information to the viewer on the allocated first subset of display screens.

Example 18 includes the subject matter of any one of Examples 1-17, and wherein the user interaction module is to allocate a second subset of display screens to another viewer and display additional information to the another viewer on the second subset of display screens.

Example 19 includes a mobile communication device for interacting with an interactive digital sign, the mobile communication device comprising a detection module to detect the presence of an interactive digital sign within a pre-defined range of the mobile communication device; a communication module to establish a wireless communication link with the digital interactive sign in response to detection of the presence of the interactive digital sign; and a digital sign interaction module to receive a request for user data from the interactive digital sign, transmit user data to the interactive digital sign using a mark-up language extension to identify parameters of the user data, and interact with the digital sign over the wireless communication link to cause the digital interactive sign to display information in response to the interaction.

Example 20 includes the subject matter of Example 19, wherein the user data comprises at least one of: user profile data defining personal characteristics of a user of the mobile communication device, user preference data indicative of preferences of a user of the mobile communication device, and shopping list data identifying a shopping list of purchasable items.

Example 21 includes the subject matter of any one of Examples 19 or 20, and wherein the user data comprises at least one of: a mark-up language tag that identifies a location of the mobile communication device, a mark-up language tag that identifies user preference data indicative of preferences of the user of the mobile communication device, a mark-up language tag that identifies identification data usable to identify the user of the mobile communication device, and a mark-up language tag that identifies a shopping list of the user of the mobile communication device.

Example 22 includes the subject matter of any one of Examples 19-21, and wherein the user data comprises user preference data that identifies at least one of: the user's preference for digital coupons, a type of interactive digital sign preferred by the user, and a brand preference of the user.

Example 23 includes the subject matter of any one of Examples 19-22, and wherein the digital sign interaction module is to (i) receive sign data from the interactive digital sign as a function of the user data, the sign data comprising at least one of: a digital advertisement, a digital coupon, and a digital map, and (ii) display the sign data on the mobile communication device.

Example 24 includes the subject matter of any one of Examples 19-23, and wherein the digital sign interaction module is to transmit multimedia data to the interactive digital sign configured for display by the interactive digital sign.

Example 25 includes the subject matter of any one of Examples 19-24, and wherein the multimedia data comprises at least one of: a digital picture, a digital movie, a graphical representation, text data, and audio data.

Example 26 includes the subject matter of any one of Examples 19-25, and wherein the multimedia comprises a digital avatar and the interaction module is to interact with the digital interactive sign over the communication link to cause the digital avatar to perform at least one action.

Example 27 includes a method for providing interactivity on a digital sign, the method comprising receiving, on the interactive digital sign, sensor data from at least one sensor of the interactive digital sign, the sensor data indicative of context parameters of a viewer of the interactive digital sign; detecting the presence of the viewer within a pre-defined range of a display of the interactive digital sign as a function of the sensor data; selecting information to be displayed on the interactive digital sign as a function of the presence of the viewer and at least one additional context parameter of the viewer; and displaying the selected information on the display of the interactive digital sign in view of the viewer.

Example 28 includes the subject matter of Example 27, and wherein receiving sensor data comprises at least on of: receiving data from a camera of the interactive digital sign, receiving data from a microphone of the interactive digital sign, receiving data from a proximity sensor of the interactive digital sign, and receiving data from a communication circuit of the interactive digital sign.

Example 29 includes the subject matter of any one of Examples 27 or 28, and wherein selecting information to be displayed on the interactive digital sign comprises selecting information to be displayed as a function of the presence of the viewer and at least one of: a physical characteristic of the viewer determined based on an analysis of image data of the viewer received from a camera of the interactive digital sign, a physical characteristic of the viewer determined based on analysis of voice data supplied by the viewer and received from a microphone of the interactive digital sign, and text data supplied by the viewer.

Example 30 includes the subject matter of any one of Examples 27-29, and further includes identifying at least one physical gesture performed by the viewer, and wherein selecting information to be displayed on the interactive digital sign comprises selecting information to be displayed as a function of the presence of the viewer and the at least one physical gesture performed by the viewer.

Example 31 includes the subject matter of any one of Examples 27-30, and wherein selecting information to be displayed on the interactive digital sign comprises selecting at least one of: a digital advertisement, a digital coupon, and a digital map.

Example 32 includes the subject matter of any one of Examples 27-31, and further includes detecting the presence of a mobile communication device carried by the viewer; and establishing a communication link with the mobile communication device in response to detecting the presence of the mobile communication device.

Example 33 includes the subject matter of any one of Examples 27-32, and further includes receiving user data from the mobile communication device, the user data comprising at least one of: user profile data defining personal characteristics of a user of the mobile communication device, user preference data indicative of preferences of a user of the mobile communication device, and shopping list data identifying a shopping list of purchasable items.

Example 34 includes the subject matter of any one of Examples 27-33, and further includes selecting at least one of a digital advertisement and a digital coupon to be displayed on the interactive digital sign as a function of the user data; and displaying the selected digital advertisement and/or digital coupon on the display of the interactive digital sign.

Example 35 includes the subject matter of any one of Examples 27-34, includes transmitting the selected digital advertisement and/or digital coupon to the mobile communication device.

Example 36 includes the subject matter of any one of Examples 27-35, and further includes receiving a request for information from the mobile communication device; and transmitting, in response to the request, the information to the mobile communication device over the communication link and using a markup-up language extension to identify parameters of the information.

Example 37 includes the subject matter of any one of Examples 27-36, and wherein transmitting the information comprises transmitting information including at least one of: a mark-up language tag that identifies a location of the interactive digital sign, a mark-up language tag that identifies information related to a digital coupon, and a mark-up language tag that identifies an answer to the request.

Example 38 includes the subject matter of any one of Examples 27-37, and further includes receiving a request for directions from the mobile communication device; and displaying, in response to the request, directions on the display of the interactive digital sign.

Example 39 includes the subject matter of any one of Examples 27-38, and further includes receiving multimedia data from the mobile communication device; and displaying the multimedia data on the display of the interactive digital sign.

Example 40 includes the subject matter of any one of Examples 27-39, and wherein the multimedia data comprises at least one of: a digital picture, a digital movie, a graphical representation, text data, and audio data.

Example 41 includes the subject matter of any one of Examples 27-40, and wherein the multimedia comprises a digital avatar and further comprising responding to interactions from the viewer using the digital avatar.

Example 42 includes the subject matter of any one of Examples 27-41, and further includes receiving, from the mobile communication device, a request for a computer game; and executing a computer game on the interactive digital sign using the display to facilitate game play with the viewer.

Example 43 includes the subject matter of any one of Examples 27-42, and further includes selecting a first subset of display screens from a plurality of display screens for displaying content to the viewer, and wherein displaying the selected information comprises displaying the selected information to the viewer on the first subset of display screens.

Example 44 includes the subject matter of any one of Examples 27-43, and further includes selecting a second subset of display screens from the plurality of display screens for displaying content to another viewer; and displaying additional information to the anther viewer on the second subset of display screens.

Example 45 includes an interactive digital sign comprising a processor; and a memory having stored therein a plurality of instructions that, in response to being executed by the processor, results in the processor performing the method of any one of Examples 27-44.

Example 46 includes one or more machine readable media comprising a plurality of instructions stored thereon that in response to being executed result in an interactive digital sign performing any one of Examples 27-45.

Example 47 includes a method for interacting with a digital sign using a mobile communication device, the method comprising detecting, on the mobile communication device, the presence of an interactive digital sign within a pre-defined range of the mobile communication device; establishing, in response to detecting the presence of the interactive digital sign, a wireless communication link with the digital interactive sign; receiving a request for user data from the interactive digital sign; transmitting user data from the mobile communication device to the interactive digital sign using a mark-up language extension to identify parameters of the user data; and interacting with the digital interactive sign over the wireless communication link to cause the digital interactive sign to display information in response to the interaction.

Example 48 includes the subject matter of Example 47, and wherein transmitting user data comprises transmitting at least one of: user profile data defining personal characteristics of a user of the mobile communication device, user preference data indicative of preferences of a user of the mobile communication device, and shopping list data identifying a shopping list of purchasable items.

Example 49 includes the subject matter of any one of Examples 47 or 48, and wherein transmitting user data using the mark-up language extension comprises transmitting user data including at least one of: a mark-up language tag that identifies a location of the mobile communication device, a mark-up language tag that identifies user preference data indicative of preferences of the user of the mobile communication device, a mark-up language tag that identifies identification data usable to identify the user of the mobile communication device, and a mark-up language tag that identifies a shopping list of the user of the mobile communication device.

Example 50 includes the subject matter of any one of Examples 47-49, and wherein the user data comprises user preference data that identifies at least one of: the user's preference for digital coupons, a type of interactive digital sign preferred by the user, and a brand preference of the user.

Example 51 includes the subject matter of any one of Examples 47-50, and wherein interacting with the digital interactive sign comprises receiving, on the mobile communication device, at least one of: a digital advertisement, a digital coupon, and a digital map transmitted by the interactive digital sign as a function of the user data.

Example 52 includes the subject matter of any one of Examples 47-51, and wherein interacting with the digital interactive sign comprises transmitting multimedia data to the interactive digital sign configured for display by the interactive digital sign.

Example 53 includes the subject matter of any one of Examples 47-52, and wherein the multimedia data comprises at least one of: a digital picture, a digital movie, a graphical representation, text data, and audio data.

Example 54 includes the subject matter of any one of Examples 47-53, and wherein the multimedia comprises a digital avatar and further comprising interacting with the digital interactive sign over the communication link to cause the digital avatar to perform at least one action.

Example 55 includes the subject matter of any one of Examples 47-54, and wherein interacting with the digital interactive sign comprises playing a computer game using the mobile communication device and at least one display of the digital interactive sign.

Example 56 includes a mobile communication device comprising a processor; and a memory having stored therein a plurality of instructions that, in response to being executed by the processor, results in the processor performing the method of any one of Examples 47-55.

Example 57 includes one or more machine readable media comprising a plurality of instructions stored thereon that in response to being executed result in a mobile communication device performing any one of Examples 47-56.

The invention claimed is:

1. An interactive digital sign for providing information to a viewer, the interactive digital sign comprising:
a display;
a sensor to generate sensor data indicative of a plurality of context parameters of the viewer, wherein the plurality of context parameters includes a presence of the viewer and at least one of: (i) a physical characteristic of the viewer or (ii) a physical gesture performed by the viewer;
a viewer context determination module to detect the presence of the viewer within a pre-defined range of the display as a function of the sensor data;
a wireless communication module to detect the presence of a mobile communication device carried by the viewer and establish a communication link with the mobile communication device in response to detection of the presence of the mobile communication device; and
a user interaction module to:
receive, using the communication module, user data transmitted by the mobile computing device, the user data comprising at least one of: user profile data defining personal characteristics of a user of the mobile computing device, user preference data indicative of preferences of a user of the mobile computing device, and shopping list data identifying a shopping list of purchasable items; and
select information to be displayed on the display as a function of (i) the presence of the viewer, (ii) the at least one of the physical characteristic of the viewer and the physical gesture performed by the viewer, and (iii) the user data transmitted by the mobile computing device and to display the selected information on the display,
wherein the wireless communication module is further to transmit a digital coupon to the mobile communication device based on the user data.

2. The interactive digital sign of claim 1, wherein the sensor comprises a microphone.

3. The interactive digital sign of claim 1, wherein the information selected by the user interaction module comprises at least one of: an advertisement, a digital coupon, and a digital map.

4. The interactive digital sign of claim 1, wherein the user interaction module is to (i) select at least one of a digital advertisement and a digital coupon to be displayed on the display as a function of the user data and (ii) display the selected advertisement and/or digital coupon on the display.

5. The interactive digital sign of claim 1, wherein the user interaction module is to receive a request for information from the mobile communication device and transmit, in response to the request and using the communication module, information to the mobile communication device using a markup-up language extension to identify parameters of the information.

6. The interactive digital sign of claim 5, wherein the transmitted information includes at least one of a mark-up language tag that identifies a location of the interactive digital sign, a mark-up language tag that identifies information related to a digital coupon, and a mark-up language tag that identifies an answer to the request.

7. The interactive digital sign of claim 1, wherein:
the display comprises a plurality of display screens, and
the user interaction module is to allocate a first subset of display screens and display the selected information to the viewer on the allocated first subset of display screens.

8. The interactive digital sign of claim 7, wherein the user interaction module is to allocate a second subset of display screens to another viewer and display additional information to the another viewer on the second subset of display screens.

9. One or more non-transitory, machine readable storage media comprising a plurality of instructions stored thereon that in response to being executed result in an interactive digital sign:
receiving, on the interactive digital sign, sensor data from at least one sensor of the interactive digital sign, the sensor data indicative of a plurality of context parameters of a viewer of the interactive digital sign, wherein the plurality of context parameters comprises a presence of the viewer and a physical characteristic of the viewer;
detecting the presence of the viewer within a pre-defined range of a display of the interactive digital sign as a function of the sensor data;
detecting the presence of a mobile communication device carried by the viewer;
establishing a communication link with the mobile communication device in response to detecting the presence of the mobile communication device;
receiving user data from the mobile computing device, the user data comprising at least one of: user profile data defining personal characteristics of a user of the mobile computing device, user preference data indicative of preferences of a user of the mobile computing device, and shopping list data identifying a shopping list of purchasable items;
selecting information to be displayed on the interactive digital sign as a function of the presence of the viewer, the physical characteristic of the viewer, and the user data transmitted by the mobile computing device;
displaying the selected information on the display of the interactive digital sign in view of the viewer;
transmitting a digital coupon to the mobile communication device based on the user data.

10. The one or more non-transitory, machine readable storage media of claim 9, wherein each of the presence of the viewer and the physical characteristic of the viewer are determined based on voice data supplied by the viewer and received from a microphone of the interactive digital sign.

11. The one or more non-transitory, machine readable storage media of claim 9, wherein the plurality of instructions further result in the interactive digital sign identifying at least one physical gesture performed by the viewer, and
wherein selecting information to be displayed on the interactive digital sign comprises selecting information to be displayed as a function of the presence of the viewer and the at least one physical gesture performed by the viewer.

12. The one or more non-transitory, machine readable storage media of claim 9, wherein the plurality of instructions further result in the interactive digital sign:
receiving a request for information from the mobile communication device; and
transmitting, in response to the request, the information to the mobile communication device over the communication link and using a markup-up language extension to identify parameters of the information.

13. The one or more non-transitory, machine readable storage media of claim 12, wherein transmitting the information comprises transmitting information including at least one of: a mark-up language tag that identifies a location of the interactive digital sign, a mark-up language tag that identifies information related to a digital coupon, and a mark-up language tag that identifies an answer to the request.

14. The one or more non-transitory, machine readable storage media of claim 9, wherein the plurality of instructions further result in the interactive digital sign:
receiving a request for directions from the mobile communication device; and displaying, in response to the request, directions on the display of the interactive digital sign.

15. A method for providing interactivity on a digital sign, the method comprising:
receiving, on the interactive digital sign, sensor data from at least one sensor of the interactive digital sign, the sensor data indicative of a plurality of context parameters of a viewer of the interactive digital sign, wherein the plurality of context parameters comprises a presence of the viewer and a physical characteristic of the viewer;
detecting the presence of the viewer within a pre-defined range of a display of the interactive digital sign as a function of the sensor data;
detecting the presence of a mobile communication device carried by the viewer;
establishing a communication link with the mobile communication device in response to detecting the presence of the mobile communication device;
receiving user data from the mobile computing device, the user data comprising at least one of: user profile data defining personal characteristics of a user of the mobile computing device, user preference data indicative of preferences of a user of the mobile computing device, and shopping list data identifying a shopping list of purchasable items;
selecting information to be displayed on the interactive digital sign as a function of the presence of the viewer, the physical characteristic of the viewer, and the user data transmitted by the mobile computing device;
displaying the selected information on the display of the interactive digital sign in view of the viewer;
transmitting a digital coupon to the mobile communication device based on the user data.

16. The method of claim 15, wherein each of the presence of the viewer and the physical characteristic of the viewer are determined based on voice data supplied by the viewer and received from a microphone of the interactive digital sign.

17. The method of claim 15, further comprising:
receiving a request for information from the mobile communication device; and
transmitting, in response to the request, the information to the mobile communication device over the communication link and using a markup-up language extension to identify parameters of the information.

18. The method of claim 17, wherein transmitting the information comprises transmitting information including at least one of: a mark-up language tag that identifies a location of the interactive digital sign, a mark-up language tag that identifies information related to a digital coupon, and a mark-up language tag that identifies an answer to the request.

* * * * *